United States Patent
Griggs

[11] 3,783,549
[45] Jan. 8, 1974

[54] ANTI-SNAGGING FISHING GEAR
[75] Inventor: W. Kenneth Griggs, Champaign, Ill.
[73] Assignee: The Raymond Lee Organization Inc., New York, N.Y.
[22] Filed: Oct. 20, 1971
[21] Appl. No.: 190,953

[52] U.S. Cl.................. 43/42.4, 43/43.13, 43/44.97
[51] Int. Cl....................... A01k 85/04, A01k 95/00
[58] Field of Search................. 43/42.4, 43.2, 44.97, 43/43.13, 42.42

[56] References Cited
UNITED STATES PATENTS

| 3,662,485 | 5/1972 | Klemkowski, Jr. | 43/42.4 X |
| 2,895,252 | 7/1959 | Tibbetts | 43/43.2 X |
| 3,238,660 | 3/1966 | Pcola | 43/43.13 X |
| 2,549,458 | 4/1951 | Grimm | 43/42.4 X |
| 3,137,962 | 6/1964 | Linley, Sr. | 43/43.13 |
| 2,798,332 | 7/1957 | Garrison | 43/44.97 |

Primary Examiner—Louis G. Mancene
Assistant Examiner—James H. Czerwonky
Attorney—Howard I. Podell

[57] ABSTRACT

A device for use with fishing tackle to prevent snagging and loss of fishing lures and sinkers. The device consists of a curved flat runner fastened to three trailing legs of stiff wire. The fishing line is threaded through eyes at the head and tail of the runner and then fastened to the lures and sinker. In operation the tripod configuration of the three trailing wires guides the curved runner to ride over and around underwater obstructions including rocks, weeds and underwater tree limbs.

3 Claims, 2 Drawing Figures

PATENTED JAN 8 1974 3,783,549
FIG. I
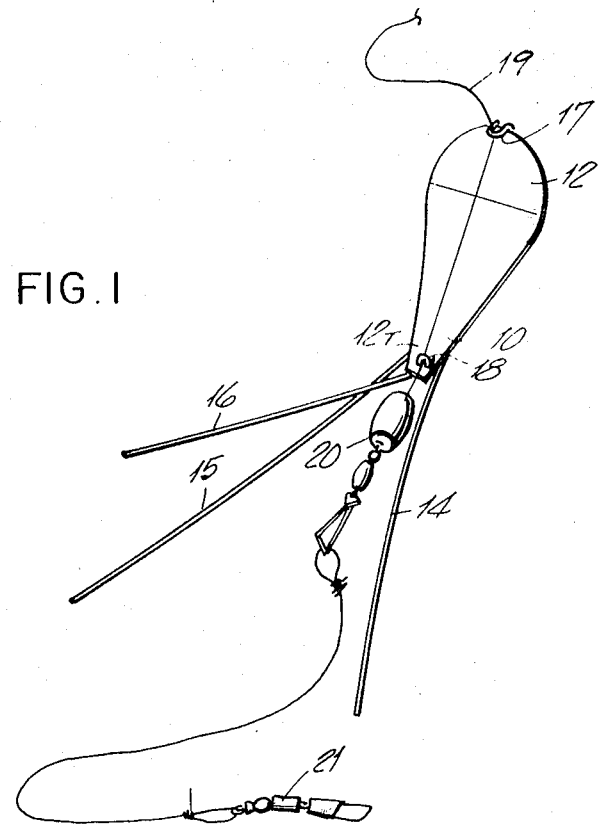
FIG. 2
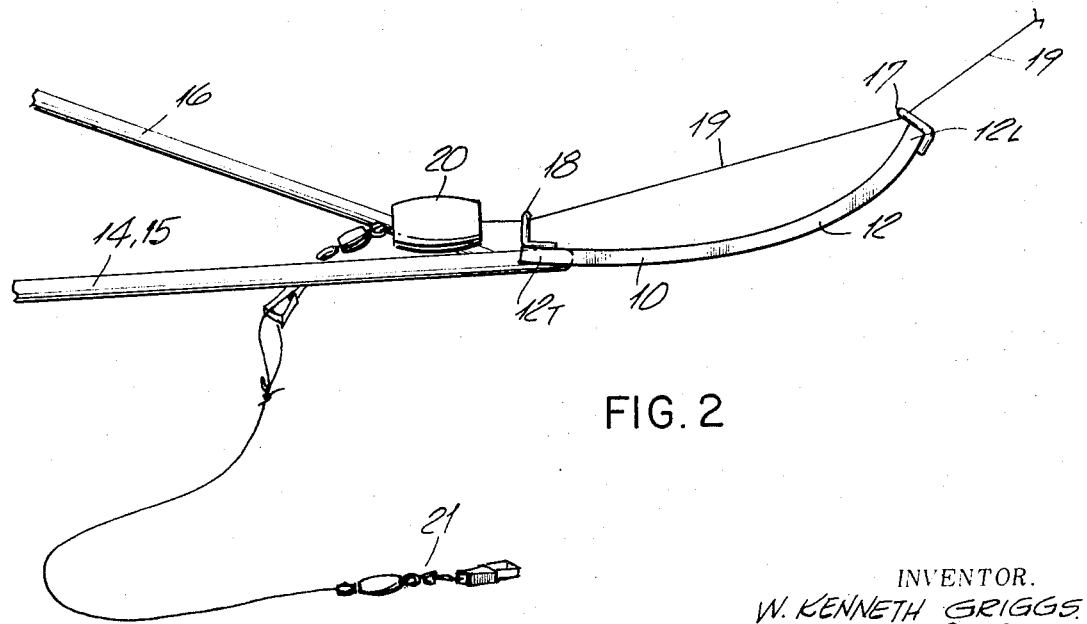
INVENTOR.
W. KENNETH GRIGGS.
BY
ATTORNEY

ANTI-SNAGGING FISHING GEAR

BACKGROUND OF THE INVENTION

Loss of fishing tackle is common to fisherman of streams and rivers with stony bottoms, such loss frequently being caused by the sinkers of the line catching under or between rocks. Other objects which also may snag the sinker of the line include underwater tree limbs and sunken debris.

With my invention, the fishing line, including the sinker and the lure rides over underwater rocks, logs, and limbs. The device has, in fact, prevented snagging of the line when miscast, through brush piles and tree tops.

SUMMARY OF THE INVENTION

This invention relates to a means for eliminating the snagging of fishing line sinkers by underwater rocks and debris.

The device is inserted on the fishing line, just ahead of the lure and sinker. The device includes a flat curved runner which is guided by three trailing legs of wires fastened in tripod fashion to the rear of the runner.

In operation, the combination of the guiding effect of the trailing legs, and the flat spoon shaped head of the runner, enables the runner to lift the line away from obstructions so that the trailing sinker and lure will clear said obstructions.

The essential features of the shape of the runner is that of a flat metal sheet curved basically about an axis transverse to the direction of the fishing line. The three trailing wire's legs of the runner are oriented so that two of the wires are in the general plane of the rear surface of the runner, with the third wire protruding upwards from the runner, when the runner is lying on a surface with the forward curve of the runner also curving upwards. The third wire leg is less than half the length of either of the other two generally equal length wire legs, so that when the runner is pulled by the fishing line while resting on the bottom, the stable position of the device is achieved with the leading edge of the runner curving upwards and the trailing edge of the runner and the two longer legs resting on the bottom, with the third shorter leg projecting upwards. Should the runner rotate to some other orientation as it is pulled along the bottom, the projecting shorter third leg will catch against the bottom and cause the runner to rotate back to the stable position with the leading edge of the runner pointing upwards.

DESCRIPTION OF THE DRAWING

The objects and features of the invention may be understood with reference to the following detailed description of an illustrative embodiment of the invention taken together with the accompanying drawing in which:

FIG. 1 is a perspective view of the device fastened to a fishing line; and

FIG. 2 is a side view of the device fastened to a fishing line.

DESCRIPTION OF THE PREFERRED EMBODIMENT

Turning now descriptively to the drawing, in which similar reference characters denote similar elements throughout the several views, FIG. 1 and FIG. 2 illustrate the device 10 comprising flat curved runner 12, rigidly fastened to three wire trailing legs 14, 15 and 16. Fishing line 19 passes through eyes 17 and 18 which are at the leading edge 12L and trailing edge 12T of the runner 12 respectively. A swivel 20 may be fastened to fishing line 19 after the line 19 passes trailing edge eye 18 and snap swivel 21 added. The weights and lures may be then fastened to snap swivel 21.

In operation the guiding features of trailing legs 14, 15 and 16 align the curved leading edge 12L of the runner to glide over and around obstructions. Two of the trailing legs 14 and 15 are in the general plane of the trailing edge 12T of runner 12, with the third leg 16 projecting upwards, when the runner is placed so that the leading edge 12L of the runner 12 projects upwards.

In practice, I have found that trailing legs 14 and 15 may be fashioned from piano wire of a length of 4½ inches each, with trailing leg 16 being a length of piano wire 2 inches long.

Since obvious changes may be made in the specific embodiment of the invention described herein without departing from the scope thereof, it is indicated that all matter contained herein is intended to be interpreted in an illustrative and not in a limiting sense.

Having thus described my invention, what I claim as new, and desire to secure by Letters Patent of the United States is:

1. A device for use with fishing tackle to prevent the snagging by underwater obstructions of the sinkers of the fishing line attached to the device, consisting of
   a freely sliding curved runner in the form of a flat plate curved about an axis at right angles to the direction of the fishing line, said runner having line attaching hook eyes mounted at the leading and trailing edges of the curved runner for fastening said runner to said fishing line, together with
   three wire legs fastened to the trailing edge of said curved runner, said three wire legs projecting away from said trailing edge of the curved runner, in which two of said wire legs are fastened to the trailing edge of the curved runner so as to diverge from each other and so as to be aligned in the general plane of the surface of the trailing edge of the curved runner, and in which the third one of said three wire legs and the leading edge of the curved runner both project away from the imaginery plane passing through the other two wire legs, said third wire leg and the leading edge of the curved runner both projecting in the same direction away from said imaginery plane.

2. The combination as recited in claim 1, in which the third one of said three wire legs is shorter than the other two legs.

3. The combination as recited in claim 2, in which the third one of said three wire legs is less than half the length of either of the other two legs, said other two legs being of generally equal length.

* * * * *